(12) United States Patent
Jensen et al.

(10) Patent No.: US 10,670,345 B2
(45) Date of Patent: Jun. 2, 2020

(54) PRIME SURFACE HEAT EXCHANGER WITH CONTOURED SEPARATOR MEMBERS

(71) Applicant: HONEYWELL INTERNATIONAL INC., Morris Plains, NJ (US)

(72) Inventors: Joseph Jensen, Torrance, CA (US);
Jorge Alvarez, Culver City, CA (US);
Francis Carbonell, Carson, CA (US);
Mark C. Morris, Phoenix, AZ (US);
Donald G. Godfrey, Phoenix, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 22 days.

(21) Appl. No.: 15/714,739

(22) Filed: Sep. 25, 2017

(65) Prior Publication Data

US 2019/0093956 A1 Mar. 28, 2019

(51) Int. Cl.
| | | |
|---|---|---|
| F28D 7/00 | (2006.01) | |
| B23P 15/26 | (2006.01) | |
| F28F 9/22 | (2006.01) | |
| F28F 7/02 | (2006.01) | |
| F28D 9/00 | (2006.01) | |
| F28F 9/00 | (2006.01) | |

(52) U.S. Cl.
CPC .......... *F28D 7/0091* (2013.01); *B23P 15/26* (2013.01); *F28D 9/0031* (2013.01); *F28D 9/0037* (2013.01); *F28F 7/02* (2013.01); *F28F 9/001* (2013.01); *F28F 9/22* (2013.01); *F28F 2220/00* (2013.01)

(58) Field of Classification Search
CPC ........ F28D 7/0091; F28D 7/02; F28D 9/0031; F28D 9/0037; F28F 9/001; F28F 9/22

USPC ..................................................... 165/104.14
See application file for complete search history.

(56) References Cited

U.S. PATENT DOCUMENTS

| | | | |
|---|---|---|---|
| 2,959,400 A | * | 11/1960 | Simpelaar ............. F28D 9/0037 165/166 |
| 3,111,982 A | | 11/1963 | Ulbricht |
| 4,029,146 A | | 6/1977 | Hart et al. |

(Continued)

FOREIGN PATENT DOCUMENTS

| | | |
|---|---|---|
| DE | 1100056 B | 2/1961 |
| WO | 93/12397 A1 | 6/1993 |

OTHER PUBLICATIONS

Extended EP Search Report for Application No. 18193324.3 dated Feb. 11, 2019.

*Primary Examiner* — Joel M Attey
(74) *Attorney, Agent, or Firm* — Lorenz & Kopf, LLP

(57) ABSTRACT

A heat exchanger includes a plurality of interconnected separator members that respectively include a first surface and an opposite second surface. The separator members respectively include an array of wave features. Also, the separator members are stacked and disposed in an alternating arrangement with the first surfaces of adjacent separator members facing each other and attached at the respective wave features, and with the second surfaces of adjacent separator members facing each other and attached at the respective wave features. The heat exchanger also includes a plurality of first flow passages for first fluid flow and second flow passages for second fluid flow. The second fluid and the first fluid are configured to exchange heat through the separator members.

17 Claims, 9 Drawing Sheets

(56) References Cited

U.S. PATENT DOCUMENTS

| | | | |
|---|---|---|---|
| 6,221,463 B1* | 4/2001 | White | B01D 53/885 |
| | | | 428/174 |
| 6,244,333 B1 | 6/2001 | Bergh et al. | |
| 2001/0029748 A1* | 10/2001 | Burk | B60H 1/3227 |
| | | | 62/498 |
| 2009/0183862 A1* | 7/2009 | Benezech | F28D 9/0031 |
| | | | 165/170 |
| 2013/0236299 A1 | 9/2013 | Kington et al. | |

* cited by examiner

PRIME SURFACE HEAT EXCHANGER WITH CONTOURED SEPARATOR MEMBERS

TECHNICAL FIELD

The present disclosure generally relates to a heat exchanger and, more particularly, relates to a prime surface heat exchanger with contoured separator members.

BACKGROUND

Heat exchangers have been developed for various devices, such as engine systems, computer systems, HVAC systems, and more. The heat exchangers are configured for directing heat within the device to components where such heat is beneficial to its operating performance and/or for directing heat away from components that normally cannot tolerate such high temperatures.

For example, gas turbine engines may include various heat exchangers. In one example, a class of heat exchangers known as recuperators have been developed to recover heat from the engine exhaust, which is otherwise wasted energy, and redirect the recovered engine exhaust heat to the combustion portion of the engine, to increase its overall efficiency. Specifically, the recuperator is a heat exchanger that transfers some of the waste heat in the engine exhaust to the compressed air before that air enters the combustion portion of the engine, thereby preheating it before entering the fuel combustor stage. Since the compressed air has been preheated, less fuel is needed to heat the compressed air/fuel mixture up to the desired turbine inlet temperature. By recovering some of the energy usually lost as waste heat, the recuperator can make a gas turbine engine significantly more efficient.

In another example, cooling air may be provided to various turbine engine components using cooling air extracted from other parts of the engine. More specifically, in some gas turbine engines, cooling air is extracted from the discharge of the compressor, and is then directed to certain portions of the turbine. During some operating conditions, the air that is extracted from the engine for cooling may be at temperatures that require the air to be cooled before being directed to the particular component requiring cooling. To achieve the required cooling, cooling air may be directed through one or more heat exchangers within the engine.

Conventional heat exchangers may be too heavy, bulky, and/or may not provide acceptable performance characteristics. Others may be too expensive and/or difficult to manufacture. Moreover, some heat exchangers may be susceptible to thermo-mechanical fatigue, which reduces their service life and/or necessitates costly repairs or replacement of the failed unit.

Hence, there is a need for improved heat exchangers for use in gas turbine engines and other applications having improved efficiency, reduced manufacturing costs, and increased operating lifespan. The present disclosure addresses at least these needs.

BRIEF SUMMARY

In one embodiment, a heat exchanger for a first fluid and a second fluid is disclosed. The heat exchanger includes a plurality of interconnected separator members. The separator members respectively include a first surface and an opposite second surface. The separator members respectively include an array of wave features that make the first surface and the second surface uneven and that make the first surface inverse to the second surface. Also, the separator members are stacked and disposed in an alternating arrangement with the first surfaces of adjacent separator members facing each other and attached at the respective wave features, and with the second surfaces of adjacent separator members facing each other and attached at the respective wave features. The heat exchanger also includes a plurality of first flow passages defined between respective first surfaces of the separator members. The first flow passages are configured to direct flow of the first fluid therethrough. Moreover, the heat exchanger includes a plurality of second flow passages defined between respective second surfaces of the separator member. The second flow passages are configured to direct flow of the second fluid therethrough. The second fluid and the first fluid are configured to exchange heat through the separator members.

In another embodiment, a method of manufacturing a heat exchanger for a first fluid and a second fluid is disclosed. The method includes forming a plurality of interconnected separator members. The separator members respectively include a first surface and an opposite second surface. The method also includes forming an array of wave features of the plurality of separator members. The wave features make the first surface and the second surface uneven and make the first surface inverse to the second surface. Additionally, the method includes arranging the separator members in an alternating arrangement with the first surfaces of adjacent separator members facing each other and attached at the respective wave features, and with the second surfaces of adjacent separator members facing each other and attached at the respective wave features. Furthermore, the method includes defining a plurality of first flow passages between respective first surfaces of the separator members, wherein the first flow passages are configured to direct flow of the first fluid therethrough. Also, the method includes defining a plurality of second flow passages between respective second surfaces of the separator member, wherein the second flow passages configured to direct flow of the second fluid therethrough. The second fluid and the first fluid are configured to exchange heat through the separator members.

In further embodiments, a heat exchanger for a first fluid and a second fluid is disclosed. The heat exchanger includes a housing and a plurality of separator members that are integrally connected together and that are integrally connected to the housing to be unitary. The separator members respectively include a first surface and an opposite second surface. The separator members respectively include an array of wave features that make the first surface and the second surface uneven and that make the first surface inverse to the second surface. Also, the separator members are stacked and disposed in an alternating arrangement with the first surfaces of adjacent separator members facing each other and attached at the respective wave features, and with the second surfaces of adjacent separator members facing each other and attached at the respective wave features. Furthermore, the heat exchanger includes a plurality of first flow passages cooperatively defined by the housing and the plurality of separator members. The first flow passages are defined between respective first surfaces of the separator members. The first flow passages are configured to direct flow of the first fluid therethrough. Also, the heat exchanger includes a plurality of second flow passages cooperatively defined by the housing and the plurality of separator members. The second flow passages are defined between respective second surfaces of the separator member. The second flow passages are configured to direct flow of the second fluid therethrough. The second fluid and the first fluid are configured to exchange heat through the separator members.

BRIEF DESCRIPTION OF THE DRAWINGS

The present disclosure will hereinafter be described in conjunction with the following drawing figures, wherein like numerals denote like elements, and wherein.

DETAILED DESCRIPTION

Figure 1:
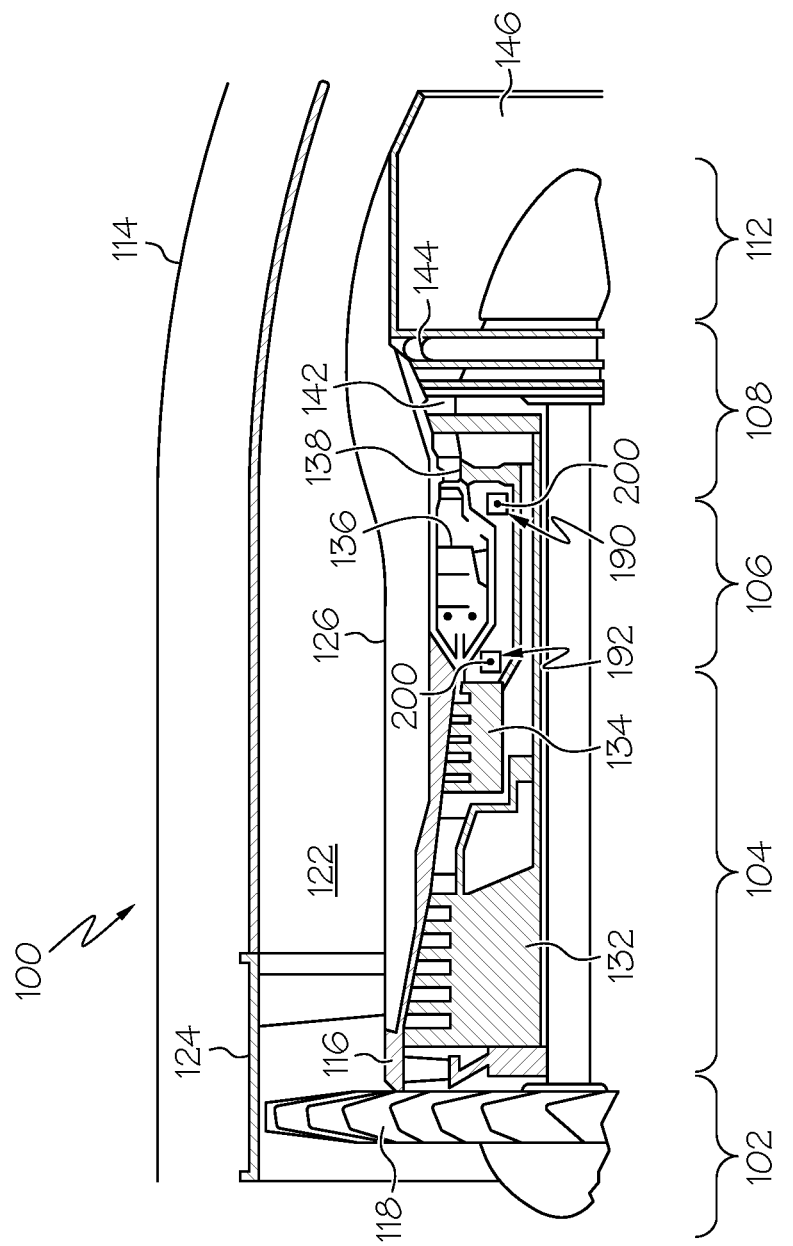
FIG. 1 is a schematic side view of a gas turbine engine with a heat exchanger according to exemplary embodiments of the present disclosure.

The following detailed description is merely exemplary in nature and is not intended to limit the present disclosure or the application and uses of the present disclosure. As used herein, the word "exemplary" means "serving as an example, instance, or illustration." Thus, any embodiment described herein as "exemplary" is not necessarily to be construed as preferred or advantageous over other embodiments. Furthermore, as used herein, numerical ordinals such as "first," "second," "third," etc. simply denote different singles of a plurality unless specifically defined by language in the appended claims. All of the embodiments and implementations of the heat exchange systems described herein are exemplary embodiments provided to enable persons skilled in the art to make or use the invention and not to limit the scope of the present disclosure, which is defined by the claims. Furthermore, there is no intention to be bound by any expressed or implied theory presented in the preceding technical field, background, brief summary, or the following detailed description.

The present disclosure relates to a heat exchanger, which may be suitable for use in gas turbine engines and other applications. The heat exchanger may provide improved heat transfer performance, reduced weight, increased manufacturability, and/or improved operational lifespan. In one implementation, the heat exchanger is embodied as a recuperator or other similar component for heating a fluid (e.g., air) prior entry into another component (e.g., a combustor). In another implementation, the heat exchanger is embodied as a cooling air heat exchanger for reducing the temperature of cooling fluid (e.g., air) prior to its delivery to another component that requires cooling (e.g., a turbine component). However, it will be appreciated that the presently disclosed heat exchanger is not limited to use in the aforementioned embodiments. Rather, it is expected that the heat exchanger disclosed herein will be suitable for use in a wide array of applications. Some non-limiting examples include engine oil cooling, auxiliary power units, environmental control systems, chemical reaction systems, and any other systems where heat transfer/exchange between two fluid media is either required or desirable.

In general, the heat exchanger may include a plurality of structures that define first flow passages and second flow passages that are disposed in an alternating arrangement. A first fluid may flow through the first flow passages, and a second fluid may flow through the second flow passages, and the fluids may exchange heat as a result of this simultaneous flow.

The heat exchanger may include a plurality of interconnected separator members. Each separator member may be a wall or other barrier that separates a first flow passage from a second flow passage. At least one separator member may include a plurality of wave features. The wave features may comprise undulations, peaks and troughs, and/or three-dimensionally curved surfaces. On one surface, the wave feature may cause the separator member to project into and constrict a passage. On the opposite surface, the wave feature may cause the separator member to recess away from and expand the volume of a passage. Also, the separator members may be stacked together and the wave features of adjacent separator members may be attached together. As a result, the flow direction through the passages may change as the fluids flow through the heat exchanger. Also, the cross sectional area of the passages may change considerably along the respective flow axes. In other words, the heat exchanger of the present disclosure may provide highly varying flow area through the flow length of the passages. Accordingly, the heat exchanger may provide highly efficient and effective heat transfer between the fluids. The pressure drop across the heat exchanger may also be relatively low.

Heat may be exchanged via the separator members. Accordingly, the separator member comprises a prime surface of the heat exchanger. In some embodiments, the heat exchanger may exclusively be a prime surface heat exchanger. In additional embodiments, the heat exchanger may include vanes, fins, pins, or other features to enhance the prime surface heat exchange and/or to direct flow of the fluid through the respective passage.

Moreover, the heat exchanger can be relatively lightweight. It can include relatively few parts, and those that are included can be compact and low weight. Also, the heat exchanger may have a robust construction.

Additionally, the heat exchanger can provide various manufacturing efficiencies. In some embodiments, at least part of the heat exchanger may be formed via additive manufacturing.

Referring now particularly to FIG. 1, a simplified cross section view of an exemplary gas turbine engine 100 is depicted. The depicted engine 100 includes an intake section 102, a compressor section 104, a combustion section 106, a turbine section 108, and an exhaust section 112. The intake section 102, compressor section 104, combustion section 106, turbine section 108, and exhaust section 112 are all mounted within a nacelle 114. The compressor section 104, combustion section 106, and turbine section 108 are all mounted within an engine case 116.

The intake section 102 includes a fan 118, which draws air into the engine 100 and accelerates it. A fraction of the accelerated fan air that is exhausted from the fan 118 is directed through a fan air bypass duct 122, which is defined by an outer fan duct 124, and which is spaced apart from and surrounds an inner fan duct 126. Most of the fan air that flows through the fan air bypass duct 122 is discharged from the bypass duct 122 to generate a forward thrust. The fraction of fan air that does not flow into the fan air bypass duct 122 is directed into the compressor section 104.

The compressor section 104 can include one or more compressors. The engine 100 depicted in FIG. 1 includes two compressors: an intermediate pressure compressor 132 and a high pressure compressor 134. No matter the number of compressors it includes, the air that is directed into the compressor section 104 is pressurized to a relatively high pressure. The relatively high pressure air that is discharged from the compressor section 104 is directed into the combustion section 106.

The combustion section 106 includes a combustor 136 that is coupled to receive both the relatively high pressure air and atomized fuel. The relatively high pressure air and atomized fuel are mixed within the combustor 136 and the mixture is ignited to generate combusted air. The combusted air is then directed into the turbine section 108.

The depicted turbine section 108 includes three turbines: a high pressure turbine 138, an intermediate pressure turbine 142, and a low pressure turbine 144, though it should be appreciated that any number of turbines may be included. The combusted air directed into the turbine section 108 expands through each of turbines 138, 142, 144, causing each to rotate. The air is then exhausted through a propulsion nozzle 146 disposed in the exhaust section 112 to provide additional forward thrust. As the turbines 138, 142, 144 rotate, each drives equipment in the gas turbine engine 100 via concentrically disposed shafts or spools as best seen in FIG. 1.

The engine 100 may further include at least one heat exchanger 200 (shown schematically). In some embodiments, the heat exchanger 200 may be included in a cooling air system 190 for providing cooling air to cool various portions and/or components within the engine 100. For example, the heat exchanger 200 of the cooling air system 190 may extract cooling air from the discharge of the compressor section 104 and direct the cooling air to the turbine section 108. Additionally, or in the alternative, the heat exchanger 200 may be included in a recuperator 192 for providing heated air to various portions and/or components within the engine 100. For example, the recuperator 192 may recover hot engine exhaust gas from the combustor 136 and the heat exchanger 200 therein may transfer heat from the exhaust gas to the air flowing into the combustor 136.

Figure 2:
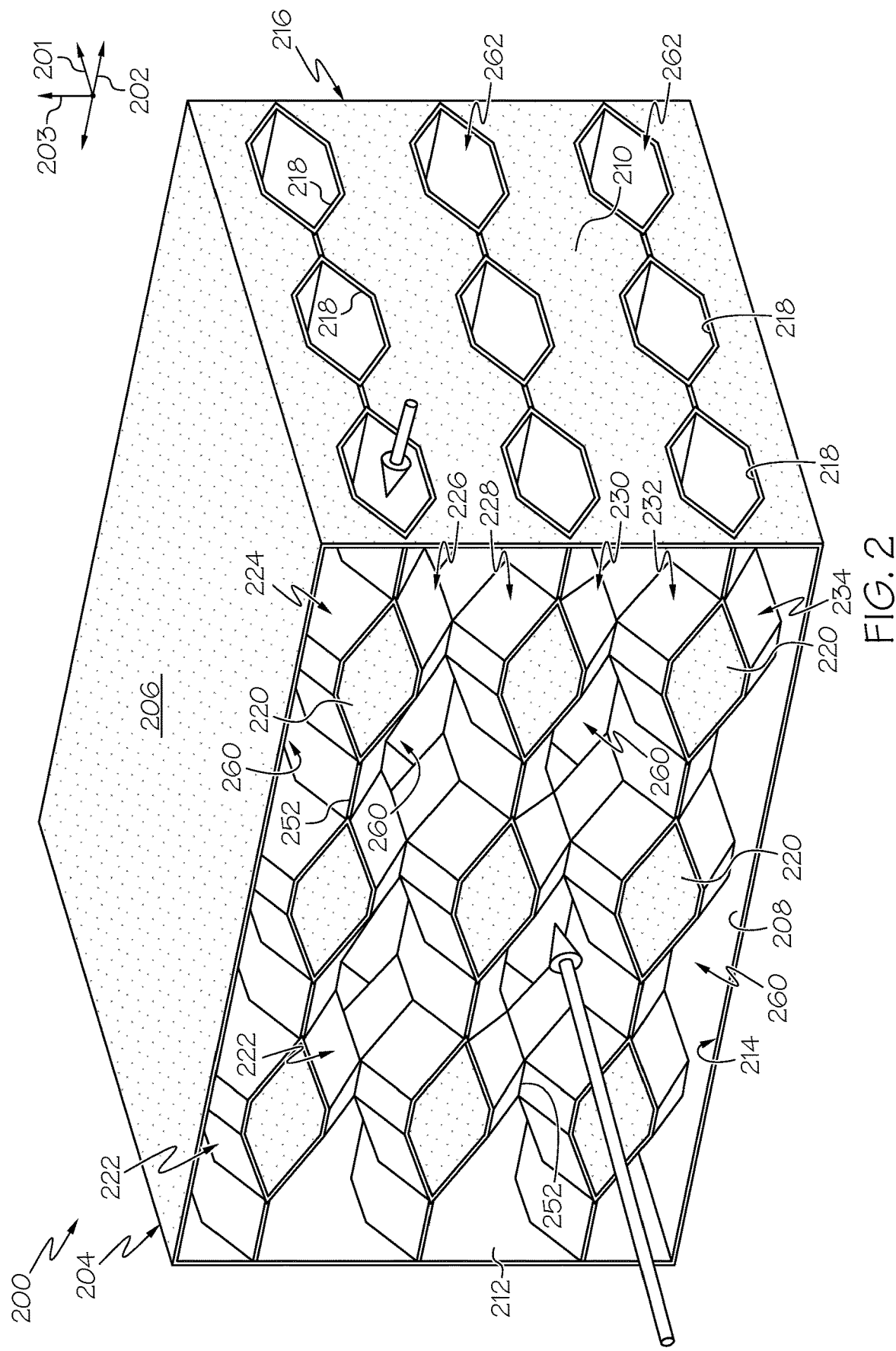
FIG. 2 is a perspective view of a heat exchanger according to example embodiments of the present disclosure, wherein the heat exchanger may be configured for use within the gas turbine engine of FIG. 1.

With reference to FIG. 2, the heat exchanger 200 will be discussed in greater detail according to example embodiments. For reference purposes, a Cartesian coordinate system is included with a first axis 201, a second axis 202, and a third axis 203.

In some embodiments, the heat exchanger 200 may include a housing 204. The housing 204 may include a top cover 206, a bottom cover 208, a first side cover 210, and a second side cover 212.

The top cover 206 and the bottom cover 208 may be relatively thin walls or panels that are continuous and substantially planar. The top cover 206 and the bottom cover 208 may be parallel to the plane defined by the first and second axes 201, 202. The top cover 206 and the bottom cover 208 may be spaced apart along the third axis 203. The first side cover 210 and the second side cover 212 may be relatively thin walls or panels that may be substantially planar. The first side cover 210 and second side cover 212 may be attached at respective sides of the top and bottom covers 206, 208. In some embodiments, the first side cover 210 and second side cover 212 may be parallel to the plane defined by the first and third axes 201, 203.

Accordingly, the housing 204 may be substantially boxlike and hollow. Also, the top cover 206, bottom cover 208, first side cover 210 and second side cover 212 may cooperate to define a first inlet end 214 of the heat exchanger 200. Likewise, the top cover 206, bottom cover 208, first side cover 210 and second side cover 212 may cooperate to define a first outlet end 216 of the heat exchanger 200. In some embodiments, the first inlet end 214 and the first outlet end 216 can be rectangular openings. Also, in some embodiments, the first inlet end 214 and the first outlet end 216 may be substantially aligned and spaced apart along the first axis 201.

The first side cover 210 and the second side cover 212 may include a plurality of apertures 218. In some embodiments, the apertures 218 may be through-holes. In some embodiments, the apertures 218 may be polygonal, ovate, or another closed shape. For example, the apertures 218 may be hexagonal in shape. The apertures 218 in the second side cover 212 are hidden from view in FIG. 2, but it will be appreciated that the apertures 218 in the second side cover 212 may be substantially similar to those of the first side cover 210. In some embodiments, the apertures 218 in the second side cover 212 may be substantially aligned along the second axis 202 with the apertures 218 in the first side cover 210.

The housing 204 may further include a plurality of cover inserts 220. The cover inserts 220 may be flat, thin-walled members or discs. In some embodiments, the cover inserts 220 may be polygonal, ovate, or otherwise shaped. For example, the cover inserts 220 may be hexagonal in shape. A group of the cover inserts 220 may be disposed proximate the first inlet end 214 as shown in FIG. 1. Another group of the cover inserts 220 (FIG. 7) may be disposed proximate the first outlet end 216.

Figure 3:
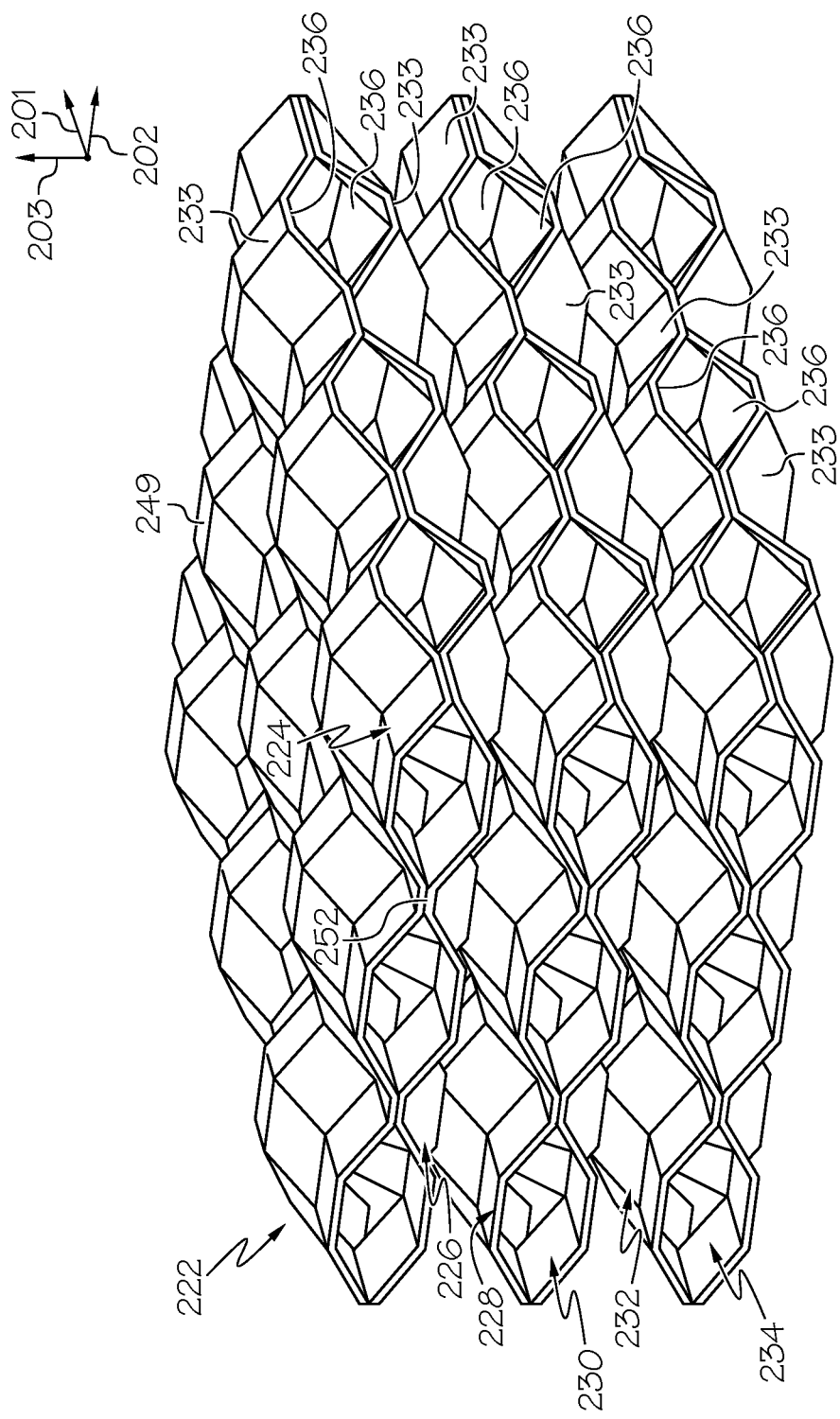
FIG. 3 is a perspective view of a plurality of separator members of the heat exchanger of FIG. 2.
Figure 4:
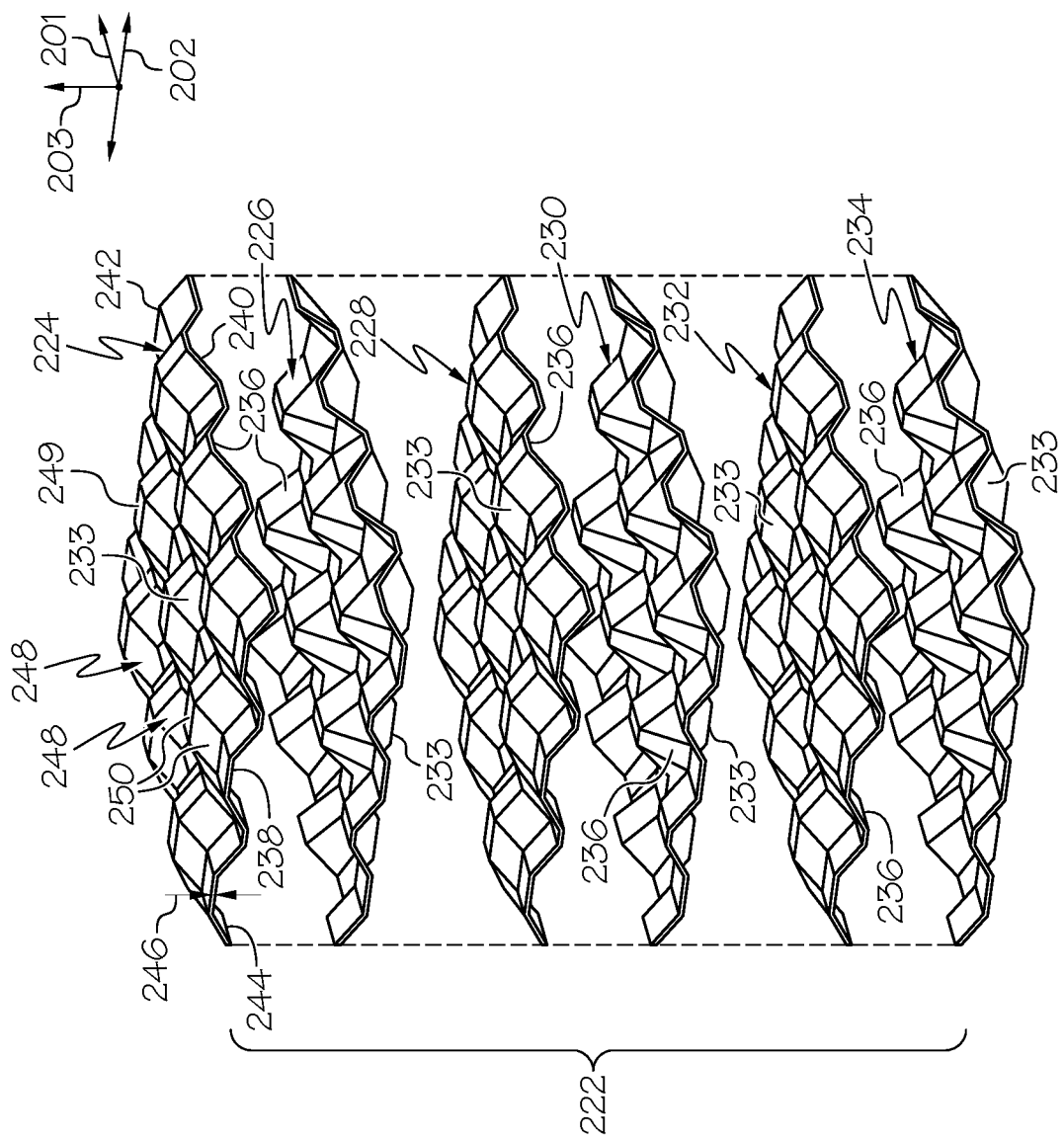
FIG. 4 is an exploded view of the separator members of FIG. 3.

As shown in FIGS. 2-4, the heat exchanger 200 may further include a plurality of separator members 222. The separator members 222 may be disposed within and attached to the housing 204. Generally, the separator members 222 may define separate flow passages for different fluids (e.g., a first fluid and a second fluid that differ in temperature). The separator members 222 may provide a path for heat transfer between the fluids. Thus, the separator members may be considered prime surface heat exchangers.

It will be appreciated that the heat exchanger 200 may include any number of separator members 222. As seen in FIG. 4, for example, the heat exchanger 200 may include a first separator member 224, a second separator member 226, a third separator member 228, a fourth separator member 230, a fifth separator member 232, and a sixth separator member 234. The separator members 222 may be substantially similar to each other. Thus, descriptions of one of the separator members 222 included below may apply to one or more of the separator members 222.

As shown in FIG. 4, the first separator member 224 may be a relatively thin-walled sheet, plate, wall, panel, etc. The first separator member 224 may include a first surface 233 and an opposite second surface 236. The first separator member 224 may also include a first edge 238, a second edge 240, a third edge 242, and a fourth edge 244. The first edge 238 and the third edge 242 may extend substantially along the second axis 202 and may be spaced apart along the first axis 201. The second edge 240 and the fourth edge 244 may extend substantially along the first axis 201 and may be spaced apart along the second axis 202.

The first separator member 224 may have a thickness 246, which is measured between the first surface 233 and the second surface 236. In some embodiments, the thickness 246 may be substantially constant across the majority of the first separator member 224. Also, in some embodiments, the thickness 246 may be substantially constant across the entirety of the first separator member 224.

The first separator member 224 may also include an array of wave features 248. The wave features 248 may define undulations, peaks and troughs, and/or three-dimensionally curved surfaces in the first separator member 224. The wave features 248 may be substantially evenly spaced apart across the first separator member 224 along the first axis 201 and the second axis 202. The wave features 248 may also define portions of the first edge 238, the second edge 240, the third edge 242, and/or the fourth edge 244.

Figure 6:
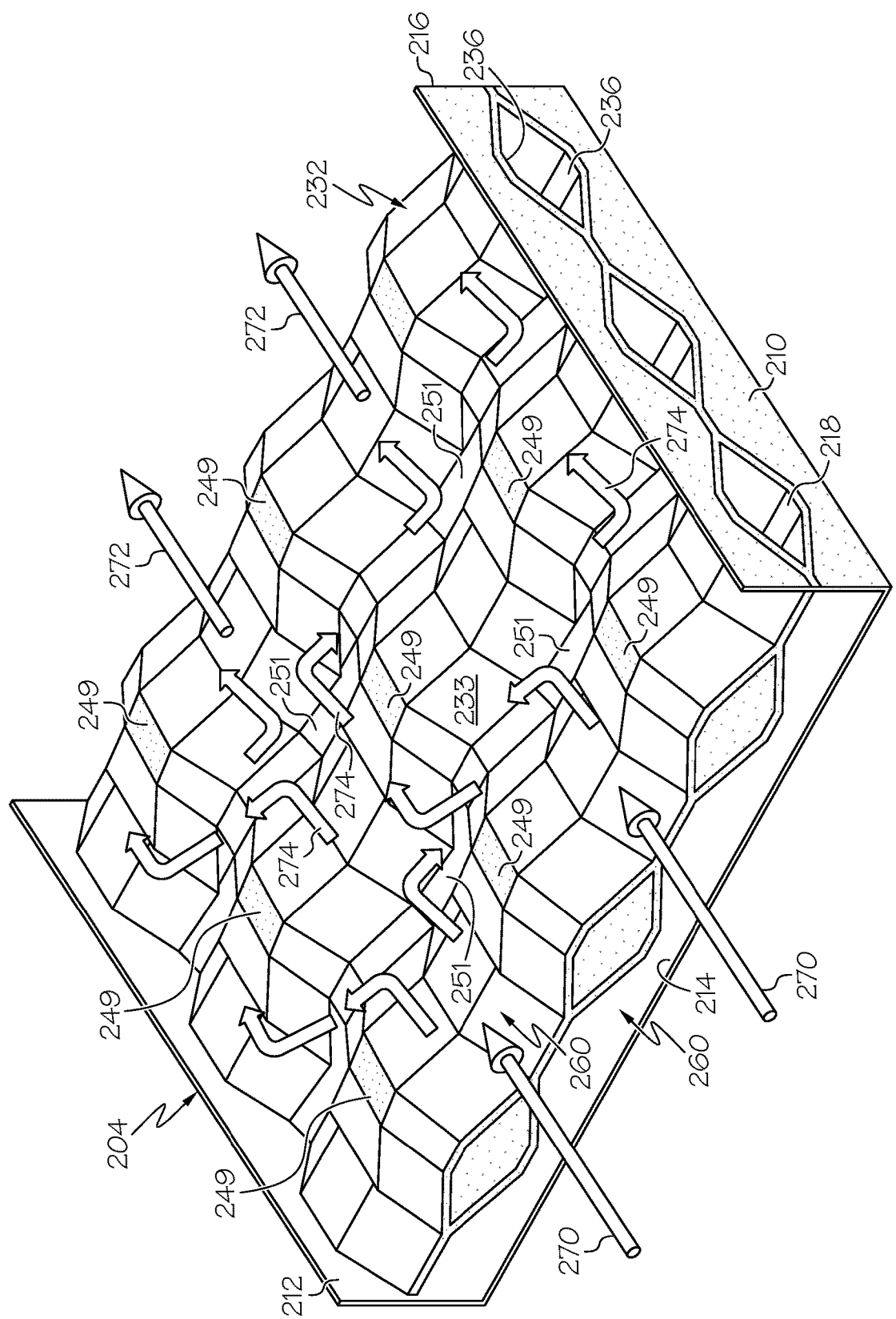
FIG. 6 is a perspective section view of the heat exchanger of FIG. 2 for directing flow of a first fluid therethrough according to example embodiments.
Figure 7:
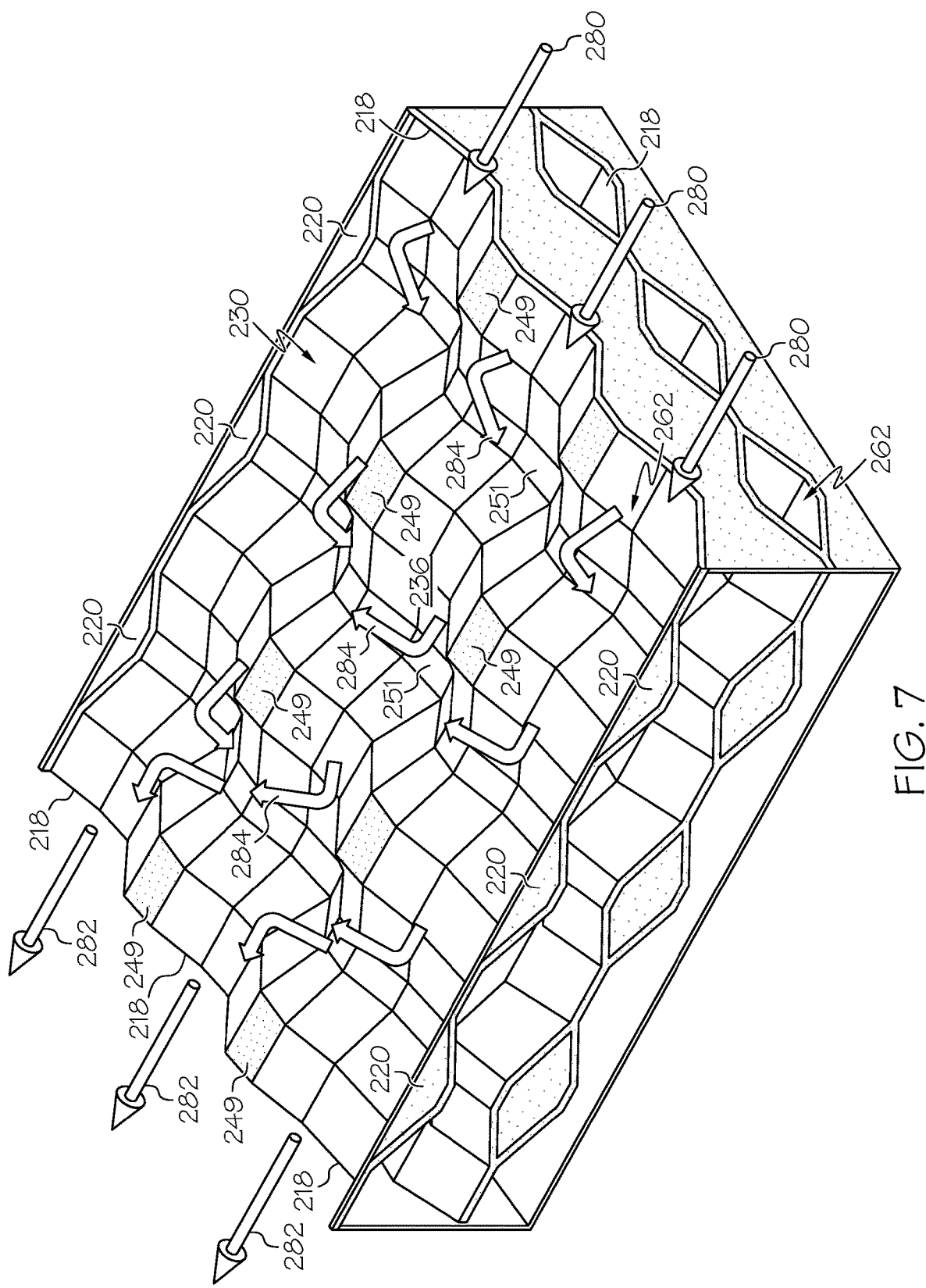
FIG. 7 is a perspective section view of the heat exchanger of FIG. 2 for directing flow of a second fluid therethrough according to example embodiments.

Accordingly, in some embodiments, the wave feature 248 may cause the first surface 233 and/or the second surface 236 to be uneven (i.e., non-planar). Portions of the first surface 233 and/or the second surface 236 may project along the third axis 203. Conversely, other portions of the first surface 233 and/or the second surface 236 may be recessed along the third axis 203. In other words, the separator member 222 may include at least one apex 249. A plurality of apexes 249 is shown in detail in FIGS. 6 and 7 according to example embodiments. The apexes 249 may be evenly spaced across the separator member 222. Also, the apex 249 may be a high point (measured along the third axis 203) for the particular wave feature 248. The apex 249 may be a planar boundary (imaginary or otherwise) between separator members 222. The apex 249 may lie within the plane defined by the first and second axes 201, 201. The apex 249 may be surrounded by one or more recesses 251. As shown in the illustrated embodiment, for example, there may be an apex 249 with four recesses 251 surrounding the apex 249. These recesses 251 may be spaced approximately evenly from each other and may be disposed in respective quadrants about the apex 249. In additional embodiments, this spacing may be uneven to promote desired fluid flow fields within the heat exchanger 200. In FIG. 6, for example, the first surface 233 of the fifth separator member 232 is shown with apexes 249 and recesses 251. In FIG. 7 the second surface 236 of the fourth separator member 230 is shown with apexes 249 and recesses 251.

In some embodiments, the first surface 233 may be inversely contoured relative to the second surface 236. For example, in some embodiments, the first surface 233 may project along the third axis 203, and an opposite portion of the second surface 236 may recess along the third axis 203. Thus, in some embodiments, an apex 249 of the first surface 233 may define a recess 251 of the second surface 236 at the same location of the separator member 222.

It will be appreciated that the wave features 248 may have a variety of shapes without departing from the scope of the present disclosure. In some embodiments, the wave features 248 may include one or more planar portions 250. For example, as shown in the illustrated embodiment of FIGS. 4, 6, and 7 at least one wave feature 248 may have a truncated pyramid shape defined by a plurality of planar portions 250 disposed at respective angles relative to each other.

Figure 5:
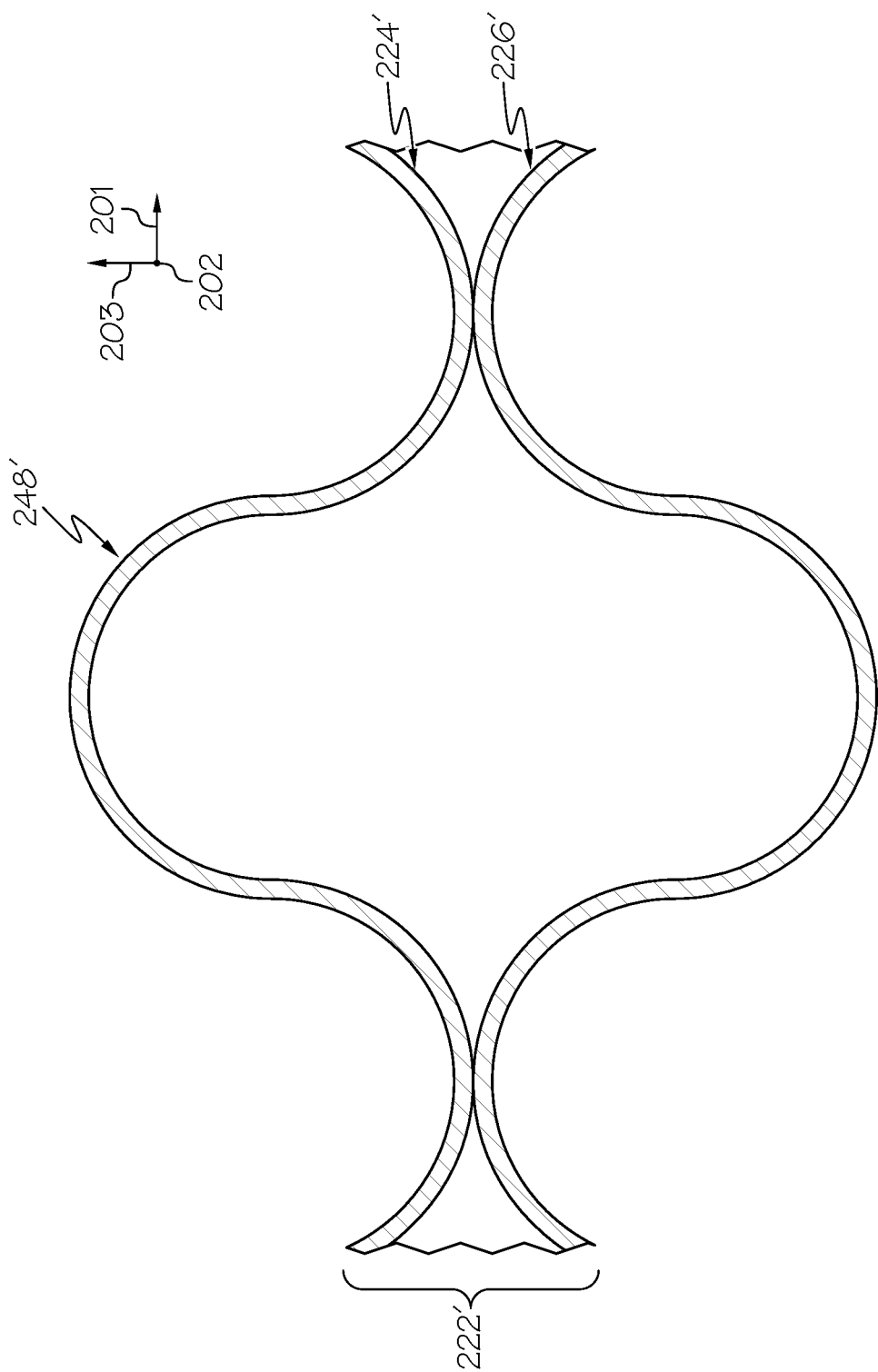
FIG. 5 is a section view of a plurality of separator members according to additional embodiments of the present disclosure.

In additional embodiments represented in FIG. 5, at least one wave feature 248' may have substantially smooth and continuous contour, for example, in the plane defined by the first axis 201 and third axis 203. It will be appreciated that the wave feature 248' may be contoured similarly within the plane defined by the second and third axes 202, 203 as well. In other words, the cross section of FIG. 5 may be similar along the plane defined by the second axis 202 and the third axis 203. Accordingly, in some embodiments, the wave features incorporated into the separator members 248' may be hemispherical in shape to provide structural and/or heat transfer performance advantages. As shown in the embodiment of FIG. 5, the first separator member 224' and the second separator member 226' may both include hemispherical wave features 248'. Other separator members 222' may be similarly shaped as well.

As shown in FIGS. 3 and 4, the separator members 222 may be stacked and disposed in alternating arrangement along the third axis 203. More specifically, every other separator member 222 in the stack may be inverted relative to the immediately adjacent separator members 222 (i.e., those separator members 222 immediately above and below with respect to the third axis 203). As such, the first surfaces 233 of adjacent pairs of separator members 222 may face each other while the second surfaces 236 of other adjacent pairs may face each other. Specifically, as shown in the illustrated embodiment, the first surfaces 233 of the second and third separator members 226, 228 may face each other. Likewise, the first surfaces 233 of the fourth and fifth separator members 230, 232 may face each other. Similarly, the second surfaces 236 of the first and second separator members 224, 226 may face each other. Likewise, the second surfaces 236 of the third and fourth separator members 228, 230 may face each other. Additionally, the second surfaces 236 of the fifth and sixth separator members 232, 234 may face each other.

The separator members 222 may be fixedly attached together within the stack as shown in FIGS. 2 and 3. In some embodiments, opposing wave features 248 may project toward each other and attach together at attachment areas 252 of the heat exchanger 200. For example, the apexes 249 of the second surface 236 of the first separator member 224 may be attached to the apexes 249 of the second surface 236 of the second separator member 226. Likewise, the apexes 249 of the first surface 233 of the second separator member 226 may be attached to the apexes 249 of the first surface 233 of the third separator member 226, and so on. The attachment areas 252 may be actual boundaries between the attached separator members 222. Otherwise, the attachment areas 252 may be imaginary boundaries between the different separator members 222, for example, in embodiments in which the neighboring separator members 222 are integrally attached.

Moreover, as shown in FIG. 2, the separator members 222 may be attached to, interconnect with, and may be incorporated within the housing 204 on the periphery. In some embodiments, the second edges 240 of the separator members 222 may be attached to the first side cover 210, and the fourth edges 244 of the separator members 222 may be attached to the second side cover 212. Additionally, the top cover 206 may be attached to the first separator member 224. The apexes 249 of the first surface 233 of the first separator member 224 may be fixed to the top cover 206 in some embodiments. Likewise, the bottom cover 208 may be attached to the sixth separator member 234. Furthermore, the plurality of cover inserts 220 may be attached and may cover over spaces defined between opposing segments of the first edge 238 and the third edge 242 of neighboring separator members 222. Also, the apertures 218 in the first and second side covers 210, 212 may be aligned with spaces that are defined between opposing segments of the second edges 240 and the fourth edges 244 of neighboring separator members 222.

Accordingly, openings, apertures, or other spaces may be defined between the separator members 222 to define various flow passages with flow inlets and outlets. Also, in some embodiments, the housing 204 and one or more separator members 222 may cooperate to define one or more flow passages with flow inlets and outlets.

More specifically, as shown in FIGS. 2 and 6, the heat exchanger 200 may include a plurality of first flow passages 260. The first flow passages 260 may be defined between opposing first surfaces 233 of the separator member. One first flow passage 260 may be defined between opposing first surfaces 233 of the second and third separator members 226, 228. Another first flow passage 260 may be defined between opposing first surfaces 233 of the fourth and fifth separator members 230, 232. An additional first flow passage 260 may be defined between the first surface 233 of the first separator member 224 and the inside of the top cover 206. Another first flow passage 260 may be defined between the first surface 233 of the sixth separator member 234 and the inside of the bottom cover 208. These first flow passages 260 may also partly defined between the first side cover 210 and the second side cover 212. The first flow passages 260 may include fluid inlets at the first inlet end 214 of the housing 204. As shown in FIG. 6, the first flow passages 260 may include fluid outlets at the first outlet end 216 of the housing 204.

As shown in FIGS. 2 and 7, the heat exchanger 200 may also include a plurality of second flow passages 262. The second flow passages 262 may be defined between opposing second surfaces 236. Specifically, a second flow passage 262 may be defined between opposing second surfaces 236 of the first and second separator members 224, 226. Another second flow passage 262 may be defined between opposing second surfaces 236 of the third and fourth separator members 228, 230. Another second flow passage 262 may be defined between opposing second surfaces 236 of the fifth and sixth separator members 232, 234. The second flow passages 262 may also be partially defined by the cover insert members 220 of the housing 204. In some embodiments, the apertures 218 in the first side cover 210 may define inlets into the second flow passages 262. As shown in FIG. 7, the apertures 218 in the second side cover 212 may define outlets from the second flow passages 262.

It will be appreciated that the first flow passages 260 may be substantially fluidly disconnected from the second flow passages 262. The first and second flow passages 260, 262 may be substantially fluidly sealed off from each other. Also, the inlets of the first flow passages 260 may receive a first fluid from a first fluid source. In some embodiments, the first fluid flowing through the first flow passages 260 may be a relatively cold gas flowing through the engine 100 of FIG. 1. Furthermore, the inlets of the second flow passages 262 may receive a second fluid from a second fluid source, such as a relatively hot gas flowing through the engine 100 of FIG. 1.

Flow through first flow passages 260 is depicted by arrows in FIG. 6 according to example embodiments. The first fluid is inlet into the heat exchanger 200 as depicted by arrows 270 and is outlet from the heat exchanger 200 as depicted by arrows 272. Thus, the first fluid flows generally along the first axis 201 (i.e., the first fluid flow axis). However, as depicted by intermediate arrows 274, the apexes 249 of the separator members 222 constrict the first fluid passage 260, redirecting flow of the first fluid as it flows through the first flow passages 260. Accordingly, the heat exchanger 200 provides highly varying flow area through the flow length of the first fluid passages 260.

Also, flow through second flow passages 262 is depicted by arrows in FIG. 7 according to example embodiments. The second fluid is inlet into the heat exchanger 200 as depicted by arrows 280 and is outlet from the heat exchanger 200 as depicted by arrows 282. Thus, the second fluid flows generally along the second axis 202 (i.e., the second fluid flow axis). However, as depicted by intermediate arrows 284, the apexes 249 of the separator members 222 constrict the second fluid passages 262, redirecting flow of the second fluid as it flows through the second flow passages 262. Accordingly, the heat exchanger 200 provides highly varying flow area through the flow length of the second fluid passages 262.

Heat may be exchanged between the first and second fluid through the separator members 222 and the fluid flow over those members. Accordingly, the separator members 222 may comprise a prime surface of the heat exchanger 200. The highly varying flow area through the first and second flow passages 260, 262 may increase the efficiency of the heat exchanger 200 while increasing the pressure drop across the heat exchanger 200 to an acceptable level. In some embodiments, the heat exchanger 200 may exclusively be a prime surface heat exchanger.

As stated above, flow through the first flow passages 260 may be directed generally along the first axis 201, and flow through the second flow passages 262 may be directed generally along the second axis 202 (i.e., orthogonal flows). It will be appreciated that this is merely an example and that the heat exchanger 200 may be configured differently without departing from the scope of the present disclosure. Accordingly, it will be appreciated that the housing 204, the fluid inlets, and the fluid outlets, etc. may be configured such that the flow of the first fluid and the second fluid is directed along the same axis. For example, the first fluid may flow opposite the second fluid in some embodiments. The first fluid may flow along the same direction in additional embodiments. Moreover, the heat exchanger 200 may be configured such that the first fluid flows at a non-orthogonal angle relative to the second fluid.

Figure 8:
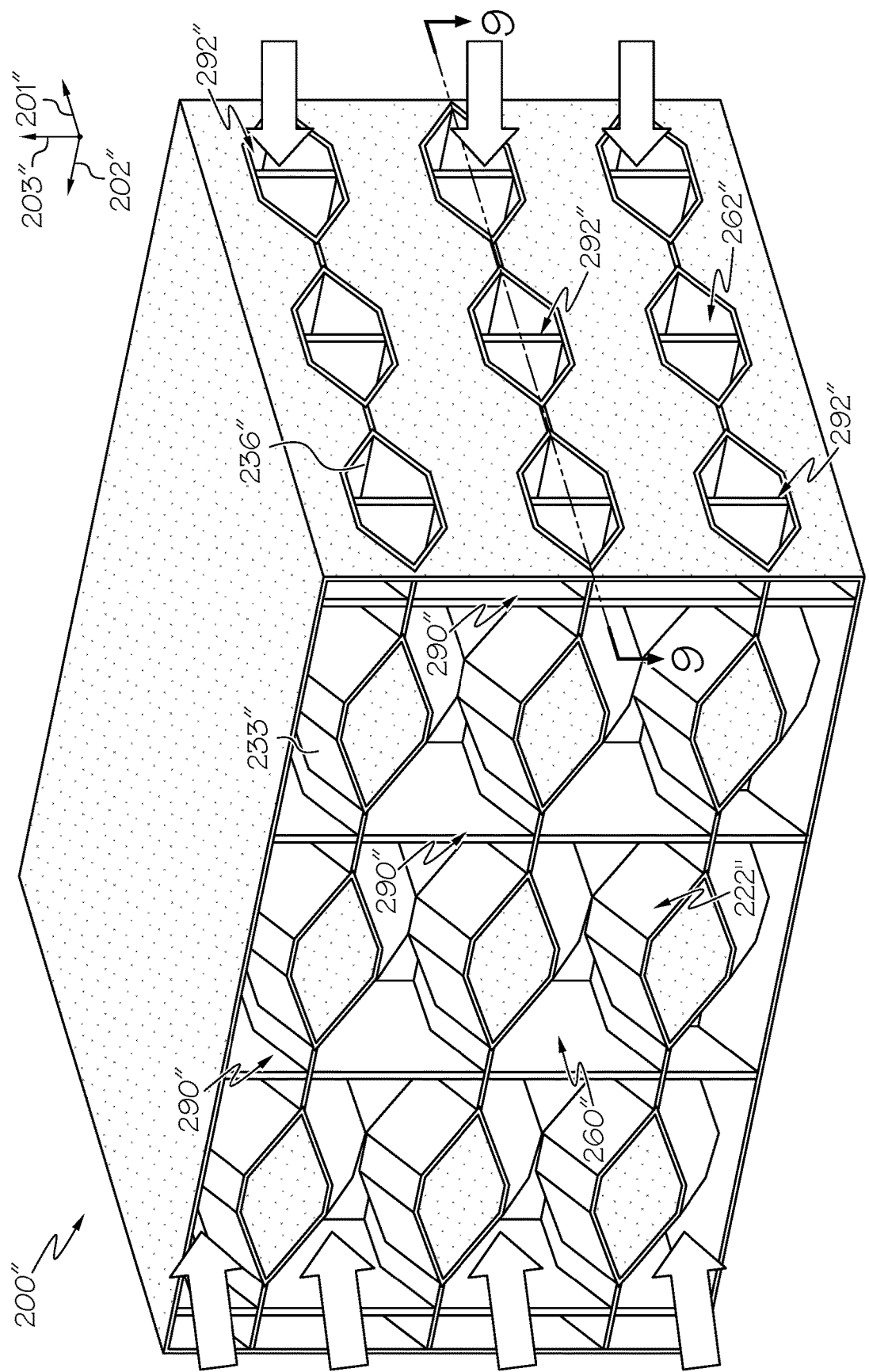
FIG. 8 is a perspective view of a heat exchanger according to additional embodiments of the present disclosure.
Figure 9:
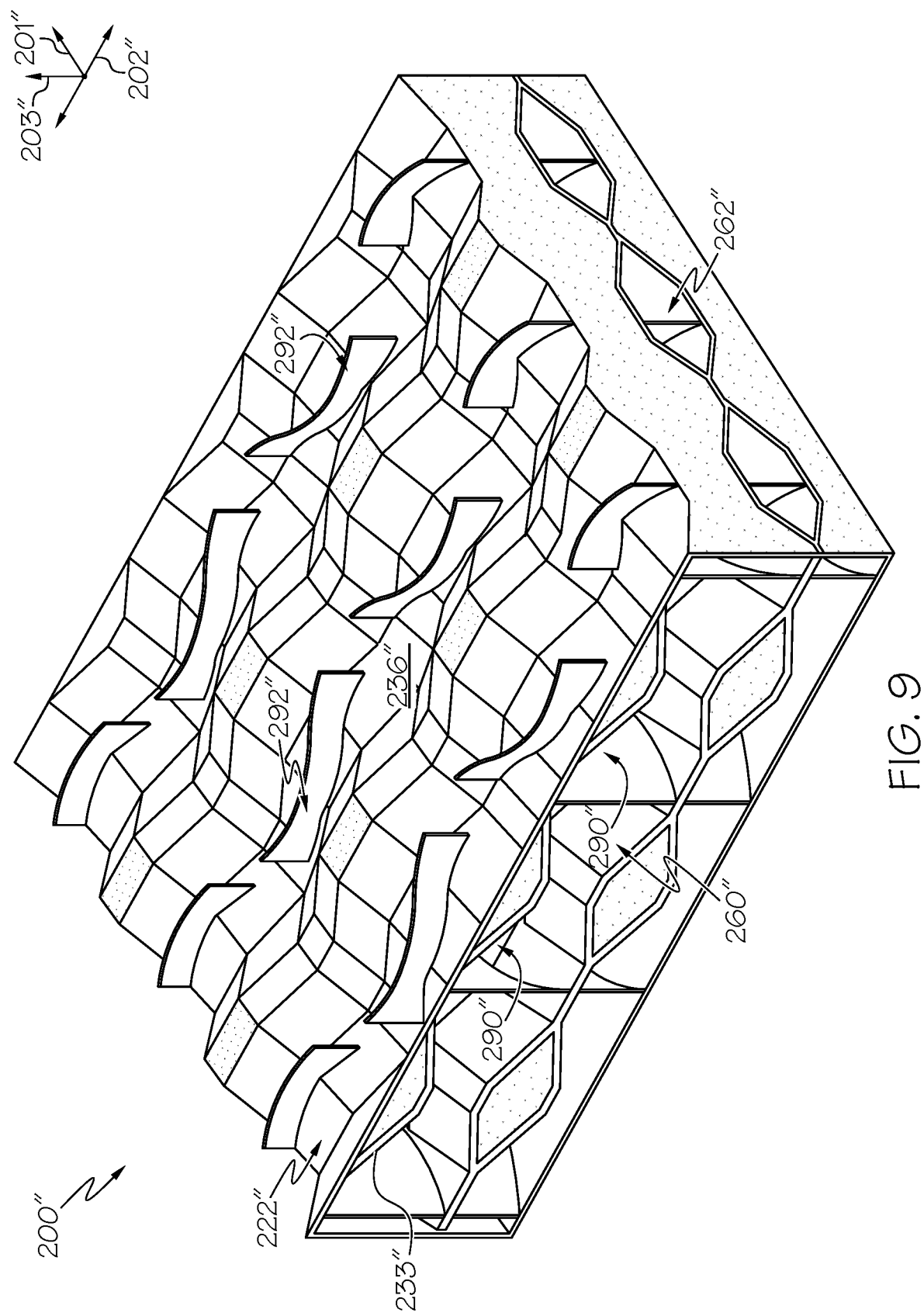
FIG. 9 is a perspective section view of the heat exchanger of FIG. 8.

In additional embodiments represented in FIGS. 8 and 9, the heat exchanger 200" may include may include vanes, fins, pins, or other projections that project into the flow passages. As shown, the heat exchanger 200" may include first vanes 290" that project from the first surfaces 233" of the separator members 222", generally along the third axis 203". The first vanes 290" may be disposed within the first flow passages 260" and may be elongated substantially along the first axis 201". Additionally, the heat exchanger 200" may include second vanes 292" that project from the second surfaces 236" of the separator members 222", generally along the third axis 230". The second vanes 292" may be disposed within the second flow passages 262". As shown in FIG. 9, the second vanes 292" may be curved along the flow axis of the second flow passages 262".

The first and second vanes 290",292" may serve various uses. For example, the vanes 290",292" may enhance heat transfer (e.g., increase efficiency of the heat exchanger 200"). Also, the first and second vanes 290",292" may provide strength to the heat exchanger 200" by helping to distribute forces exerted thereon. Furthermore, the first and/or second vanes 290",292" may be used to direct the respective fluid through the heat exchanger 200".

It will be appreciated that the vanes 290",292" shown in FIGS. 8 and 9 are merely examples. For example, the curvature of the second vanes 292" may be adjusted so as to direct the flow of the second fluid to a particular area of the second flow passage 262".

The heat exchangers of the present disclosure may be manufactured in various ways. In some embodiments, at least part of the heat exchanger may be formed via additive manufacturing. Also, in some embodiments, at least part of the heat exchanger is formed from brazing or other techniques in which separate and independent parts are attached together piece-by-piece.

As stated, the heat exchanger of the present disclosure may be formed using additive manufacturing techniques (e.g., 3D printing techniques). Thus, the heat exchanger may be formed more accurately and at a significantly reduced cost as compared to traditional manufacturing techniques. The heat exchanger may a substantially unitary, one-piece component using these techniques. In other words, the housing and the separator members of the heat exchanger may be integrally connected so as to define a unitary, one-piece heat exchanger.

Additive manufacturing techniques include, for example, direct metal laser sintering (DMLS—a form of direct metal laser fusion (DMLF)) or electron beam additive manufacturing. The heat exchanger may be manufactured from aluminum, titanium, steel, and nickel-based alloys. Still further, casting or metal injection molding (MIM) may be employed. In some embodiments, the heat exchanger of the present disclosure may be constructed using techniques disclosed in US Patent No. 2013/0236299, the disclosure of which is hereby incorporated by reference in its entirety.

Accordingly, the heat exchanger of the present disclosure provides highly efficient heat exchange. Also, the heat exchanger may be lightweight, and yet, robust and strong for a long operating life. Additionally, the heat exchanger may provide manufacturing benefits as well.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment of the present disclosure. It is understood that various changes may be made in the function and arrangement of elements described in an exemplary embodiment without departing from the scope of the present disclosure as set forth in the appended claims.

What is claimed is:

1. A heat exchanger for a first fluid and a second fluid, the heat exchanger comprising:
a plurality of interconnected separator members, the separator members respectively including a first surface and an opposite second surface;
the separator members respectively including an array of wave features that make the first surface and the second surface uneven and that make the first surface inverse to the second surface, the wave features being spaced apart across the respective separator member along a first direction and a second direction that is transverse to the first direction, the wave features defining a plurality of apexes and a plurality of recesses with at least one of the plurality of apexes being surrounded by at least one of the plurality of recesses;
the separator members being stacked and disposed in an alternating arrangement with the first surfaces of adjacent separator members facing each other and attached at the respective wave features, and with the second surfaces of adjacent separator members facing each other and attached at the respective wave features;
a plurality of first flow passages defined between respective first surfaces of the separator members, the first flow passages configured to direct flow of the first fluid therethrough;
a plurality of second flow passages defined between respective second surfaces of the separator member, the second flow passages configured to direct flow of the second fluid therethrough, the second fluid and the first fluid being configured to exchange heat through the separator members;
the plurality of separator members including a first separator member and a second separator member; and
a housing that cooperates with at least one of the plurality of separator members to define at least one of the first flow passages and at least one of the second flow passages, the housing includes a panel that is attached to the first separator member and the second separator member, the panel including an aperture that defines one of an inlet or an outlet into one of the plurality of second flow passages.

2. The heat exchanger of claim 1, wherein one of the first flow passages is defined between the panel and the one of the plurality of separator members.

3. The heat exchanger of claim 1,
wherein the first separator member, the second separator member, and the panel cooperate to define one of the plurality of first flow passages.

4. The heat exchanger of claim 1,
wherein the housing includes at least one cover insert that covers an opening between the first separator member and the second separator member; and
wherein the cover insert, the first separator member and the second separator member cooperate to define one of the plurality of second flow passages.

5. The heat exchanger of claim 1, further comprising a plurality of projections that project from the first surface into the first flow passage, the plurality of projections configured to direct the flow of the first fluid through the first flow passage.

6. The heat exchanger of claim 5, wherein projections are chosen from a group consisting of vanes, fins, pins, and bumps.

7. The heat exchanger of claim 1, wherein at least two of the separator members are integrally attached to be unitary.

8. The heat exchanger of claim 1, wherein at least one wave feature has a planar portion.

9. The heat exchanger of claim 8, wherein the at least one wave feature has a truncated pyramid shape.

10. The heat exchanger of claim 1, wherein at least one wave feature has a three-dimensionally contoured portion.

11. The heat exchanger of claim 10, wherein the at least one wave feature has a hemispherical shape.

12. The heat exchanger of claim 1, wherein at least one of the separator members has a sheet thickness measured between the first surface and the second surface; and
wherein the sheet thickness is substantially constant across the at least one separator member.

13. The heat exchanger of claim 1, wherein the first flow passage includes a first inlet and a first outlet for the first fluid, and wherein the first flow passage generally defines a first flow axis between the first inlet and the first outlet;
wherein the second flow passage includes a second inlet and a second outlet for the second fluid, and wherein the second flow passage generally defines a second flow axis between the second inlet and the second outlet; and wherein the first flow axis is transverse relative to the second flow axis.

14. The heat exchanger of claim 13, wherein the first flow axis is substantially orthogonal to the second flow axis.

15. A heat exchanger for a first fluid and a second fluid, the heat exchanger comprising:

a housing; and a plurality of separator members that are integrally connected together and that are integrally connected to the housing to be unitary;

the separator members respectively including a first surface and an opposite second surface;

the separator members respectively including an array of wave features that make the first surface and the second surface uneven and that make the first surface inverse to the second surface, the wave features being spaced apart across the respective separator member along a first direction and a second direction that is transverse to the first direction, the wave features defining a plurality of apexes and a plurality of recesses with at least one of the plurality of apexes being surrounded by at least one of the plurality of recesses;

the separator members being stacked and disposed in an alternating arrangement with the first surfaces of adjacent separator members facing each other and attached at the respective wave features, and with the second surfaces of adjacent separator members facing each other and attached at the respective wave features;

a plurality of first flow passages being cooperatively defined by the housing and the plurality of separator members, the first flow passages defined between respective first surfaces of the separator members, the first flow passages configured to direct flow of the first fluid therethrough; and a plurality of second flow passages being cooperatively defined by the housing and the plurality of separator members, the second flow passages defined between respective second surfaces of the separator member, the second flow passages configured to direct flow of the second fluid therethrough, the second fluid and the first fluid being configured to exchange heat through the separator members, the plurality of separator members including a first separator member and a second separator member; and a housing that cooperates with at least one of the plurality of separator members to define at least one of the first flow passages and at least one of the second flow passages, the housing including a panel that is attached to the first separator member and the second separator member, the panel including an aperture that defines one of an inlet or an outlet into one of the plurality of second flow passages.

16. The heat exchanger of claim 1, wherein the first direction is orthogonal to the second direction.

17. The heat exchanger of claim 1, wherein the panel is a substantially planar panel.

* * * * *